(12) United States Patent
Nedorezov et al.

(10) Patent No.: US 8,192,328 B2
(45) Date of Patent: Jun. 5, 2012

(54) METHODS AND SYSTEMS FOR ASSISTED DIRECT START CONTROL

(75) Inventors: Felix Nedorezov, Rochester Hills, MI (US); Hong Jiang, Canton, MI (US); Roger Lyle Huffmaster, Canton, MI (US); Alex O'Connor Gibson, Ann Arbor, MI (US); Gregory Michael Pietron, Canton, MI (US); Seung-Hoon Lee, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 12/771,978

(22) Filed: Apr. 30, 2010

(65) Prior Publication Data

US 2011/0136621 A1 Jun. 9, 2011

(51) Int. Cl.
*B60W 10/00* (2006.01)

(52) U.S. Cl. ......................................... 477/94

(58) Field of Classification Search .................. None
See application file for complete search history.

(56) References Cited

U.S. PATENT DOCUMENTS

| | | | |
|---|---|---|---|
| 6,364,436 B1 | 4/2002 | Sawada | |
| 6,463,375 B2 | 10/2002 | Matsubara et al. | |
| 6,754,579 B2 | 6/2004 | Kamiya et al. | |
| 2004/0043859 A1* | 3/2004 | Yurgil et al. | 475/318 |
| 2006/0272869 A1 | 12/2006 | Hidaka et al. | |
| 2007/0078040 A1 | 4/2007 | Nobumoto et al. | |
| 2007/0114082 A1 | 5/2007 | Nozaki et al. | |
| 2007/0179695 A1 | 8/2007 | Reinke et al. | |
| 2007/0225888 A1 | 9/2007 | Morris | |
| 2008/0254940 A1 | 10/2008 | Stoffels et al. | |
| 2008/0257619 A1 | 10/2008 | Yamazaki | |
| 2008/0275625 A1* | 11/2008 | Snyder | 701/104 |
| 2009/0018715 A1 | 1/2009 | Kanayama | |

FOREIGN PATENT DOCUMENTS

| | | |
|---|---|---|
| EP | 0990793 | 8/2004 |
| GB | 2448671 | 10/2008 |
| WO | 2009024305 | 2/2009 |

OTHER PUBLICATIONS

Gibson, Alex O'Connor et al., "Methods and Systems for Engine Shut-Down Control," U.S. Appl. No. 12/348,196, filed Jan. 2, 2009, 25 pages.

\* cited by examiner

*Primary Examiner* — David D Le
*Assistant Examiner* — Erin D Bishop
(74) *Attorney, Agent, or Firm* — Julia Voutyras; Alleman Hall McCoy Russell & Tuttle LLP

(57) ABSTRACT

Methods and systems are provided for reducing driveline unwinding during successive engine shutdown and restart operations. In one example, during an engine shutdown, torsion is maintained in a transmission gear-train until an engine restart is requested by engaging one or more transmission clutches while applying wheel brakes.

17 Claims, 5 Drawing Sheets

METHODS AND SYSTEMS FOR ASSISTED DIRECT START CONTROL

FIELD

The present application relates to methods and systems for controlling an engine shutdown to reduce driveline unwinding during idle-stop.

BACKGROUND AND SUMMARY

Vehicles have been developed to perform an idle-stop when idle-stop conditions are met and then automatically restart the engine when restart conditions are met. For example, a vehicle may perform an idle-stop when a vehicle is stopped in traffic, at a light, etc., and subsequently restart the engine when motive power is requested by the driver, such as when a brake pedal is released or an accelerator pedal is depressed. By extending the period over a drive cycle during which the engine is in idle-stop, such idle-stop systems enable fuel savings, reduction in exhaust emissions, reduction in noise, and the like.

However, the inventors have recognized an issue with such systems. Frequent switching between engine idle-stop and engine restart operations may lead to objectionable noise and audible clunks due to repeated gear meshing and un-meshing. For example, shutting down the engine during an idle-stop operation can cause the driveline of the vehicle to unwind due to elimination of the torque applied to the transmission from the engine. The unwound, or un-loaded, transmission may result in physical separation between two meshing gears due to gear lash. During a subsequent engine restart from idle-stop condition, torque is re-applied to the transmission, causing a rapid re-engagement of the various gears in the driveline and a re-winding of the driveline. This rapid re-engagement can cause increased noise, vibration, and harshness (NVH), such as audible clunks which may reduce drive feel as well as customer satisfaction. Furthermore, repeated clunks and related torsional stress may degrade transmission or driveline components (e.g., transmission gears, clutches, etc.) over time.

Thus in one example, the above issue may be at least partly addressed by a method of controlling a vehicle power-train including wheels, an engine and a transmission. The method may comprise, selectively shutting down engine operation responsive to operating conditions and without receiving an engine shutdown request from the operator, and before the engine is stopped, and while positive drive torque is still transmitted through the transmission, grounding the transmission to the vehicle. The method may further comprise, maintaining the transmission grounded until restarting the engine. Wheel brakes may be applied during the shutdown, and may be released only during the subsequent engine restart.

In one example, a vehicle power-train may include an engine, a transmission with one or more transmission clutches, a torque converter coupling the engine to the transmission, and wheels. In response to idle-stop conditions, an idle-stop operation may be initiated by deactivating the engine. This may include, for example, shutting off fuel and spark to the engine cylinders. As cylinder combustion stops, the engine starts spinning down towards rest (i.e., zero speed). As such, when the engine speed reaches zero, assuming there is no slip across the torque converter, the input torque from the engine to the transmission also reaches zero. With no torque, the driveline can unwind and the transmission gears can un-mesh due to gear lash. Herein, to reduce driveline unwinding and gear separation during the shutdown, the transmission used to maintain the transmission in a wound-up torque state, including applying and maintaining application of various clutches during an engine idle-stop, and/or grounding a transmission input and/or output to the vehicle.

In one embodiment, before the engine has stopped, and while positive drive torque is still being transmitted through the transmission, the transmission may be grounded to the vehicle, while the wheel brakes are activated. Transmission grounding and wheel brake application may be maintained until a subsequent engine restart operation. The transmission may be grounded by engaging one or more transmission clutches, and locking an engaged transmission clutch to a frame of the vehicle (such as a transmission case, chassis, etc.). By locking the engaged transmission clutch while keeping wheel brakes applied, an amount of torsion may be maintained in the driveline during the engine shutdown (that is, before a subsequent engine restart). A clutch pressure may be adjusted to adjust the engagement state of the clutch (that is, a degree of clutch engagement) to attain the desired amount of transmission torsion. Wheel brake application may be coordinated with the transmission grounding operation by adjusting a wheel brake pressure based on the clutch pressure, and further based on the amount of torsion requested. Additionally, a timing, with respect to engine speed, of the transmission grounding may also be adjusted, to adjust the amount of torsional potential energy maintained within the gear-train of the transmission during the engine idle-stop. For example, the transmission may be grounded at a higher engine speed to increase the amount of torsional potential energy maintained in the transmission during the shutdown.

During a subsequent engine restart, the engine may be selectively reactivated by turning on cylinder fuel and spark. As the engine spins up, the engaged transmission may be unlocked from the vehicle and the wheel brakes may be released. A timing, with respect to engine speed, of transmission unlocking may be adjusted based on the amount of torsion maintained in the transmission before the engine was restarted. For example, as the amount of torsion remaining in the transmission before the engine is restarted increases, the transmission may be unlocked at a higher engine speed following engine restart. Wheel brake release may be coordinated with the transmission unlocking at engine restart by decreasing brake pressure once the engine speed rises above a threshold speed.

In this way, by tying up the transmission in a wound-up torque state, torsional potential energy may be maintained in the transmission during engine shutdown and before a subsequent engine re-start. By retaining some driveline torsion in the transmission during engine shutdown, it may be possible to reduce gear tooth separation during engine shutdown, and thus the subsequent gear tooth re-engagement during engine restart. In one example, because the gear teeth do not become separated, even through substantial lash may exist, NVH during a successive engine restart may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
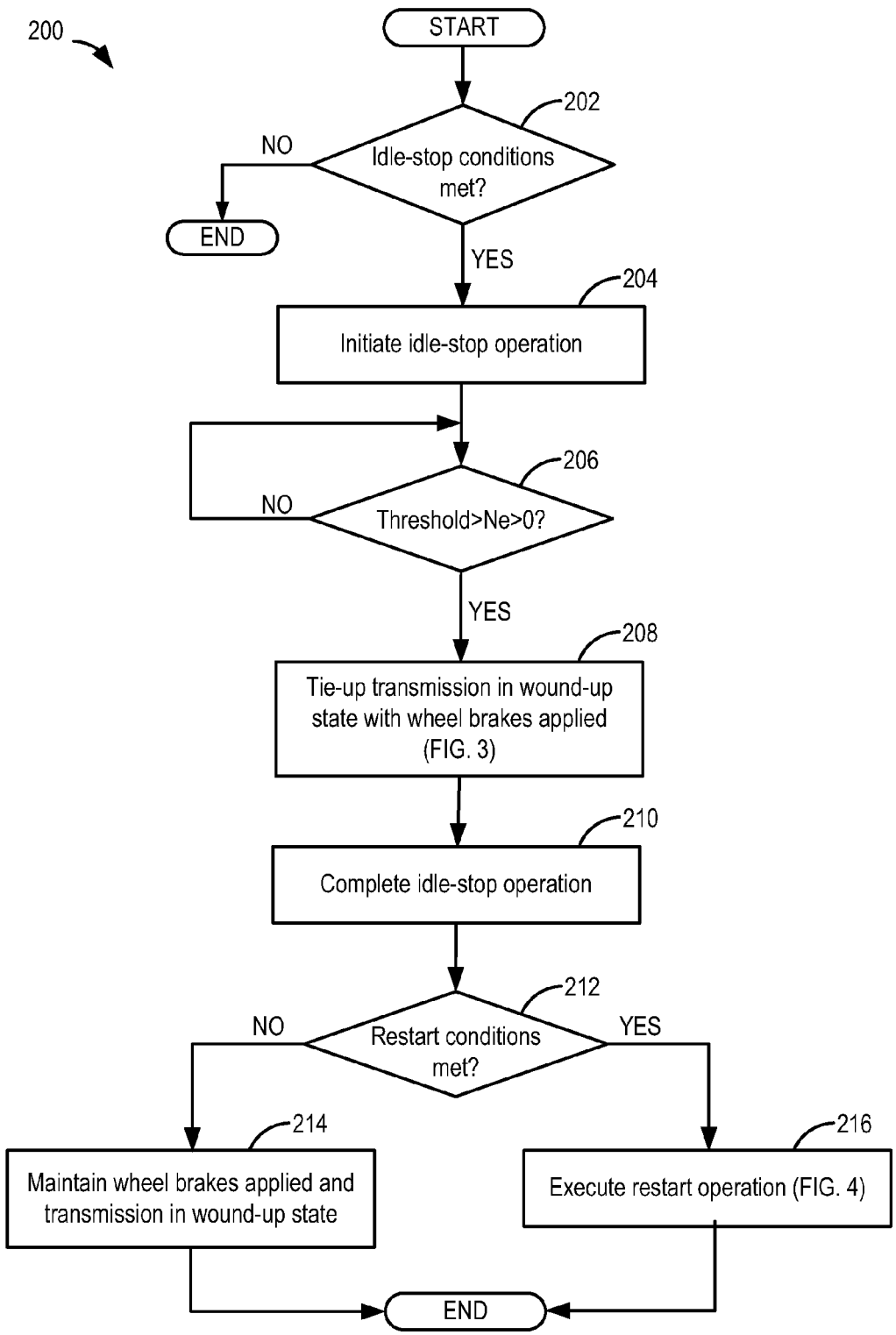
FIG. 2 shows a high level flow chart for executing an idle-stop operation with transmission torsion.
Figure 3:
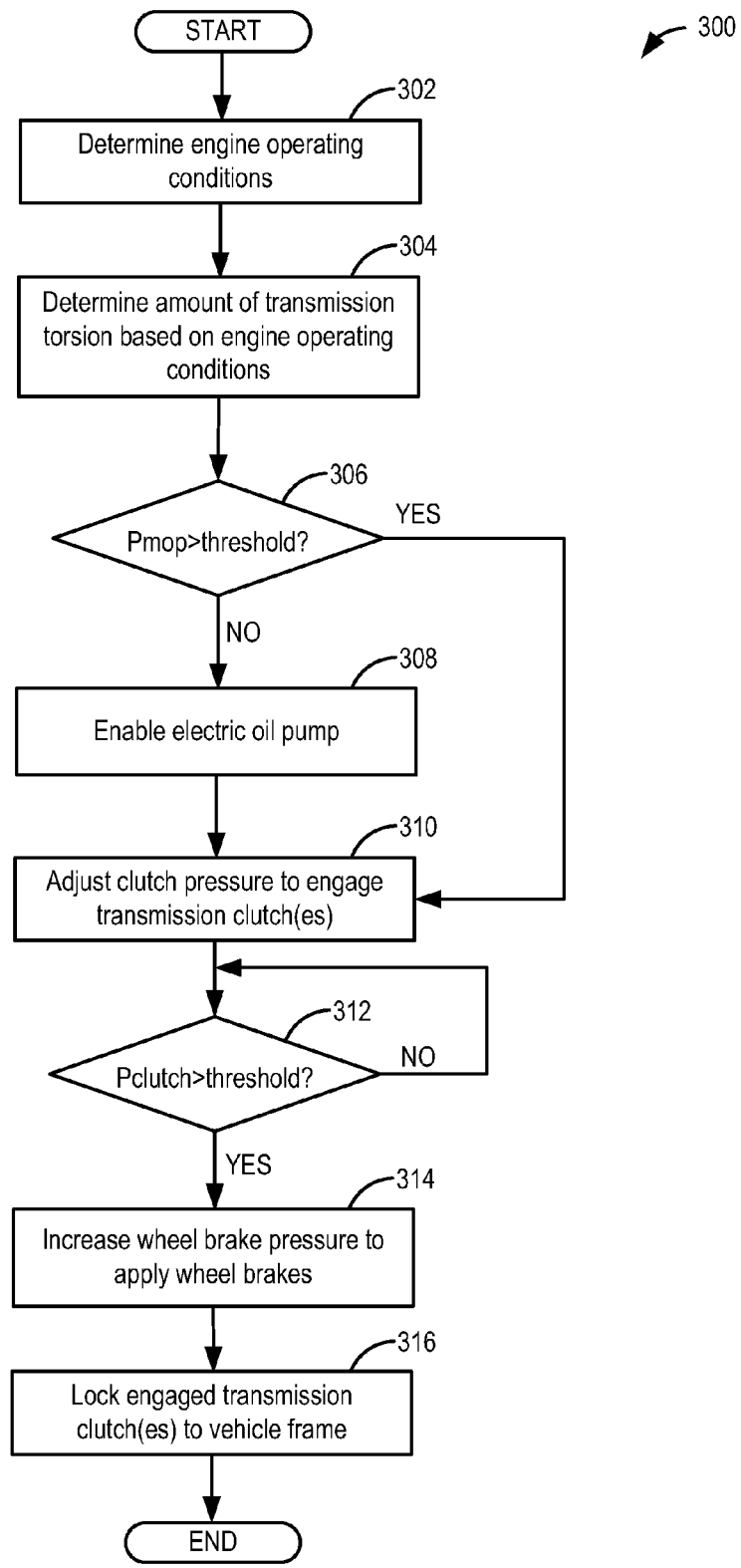
FIG. 3 shows a high level flow chart for grounding a transmission to provide transmission torsion during an engine shutdown.
Figure 4:
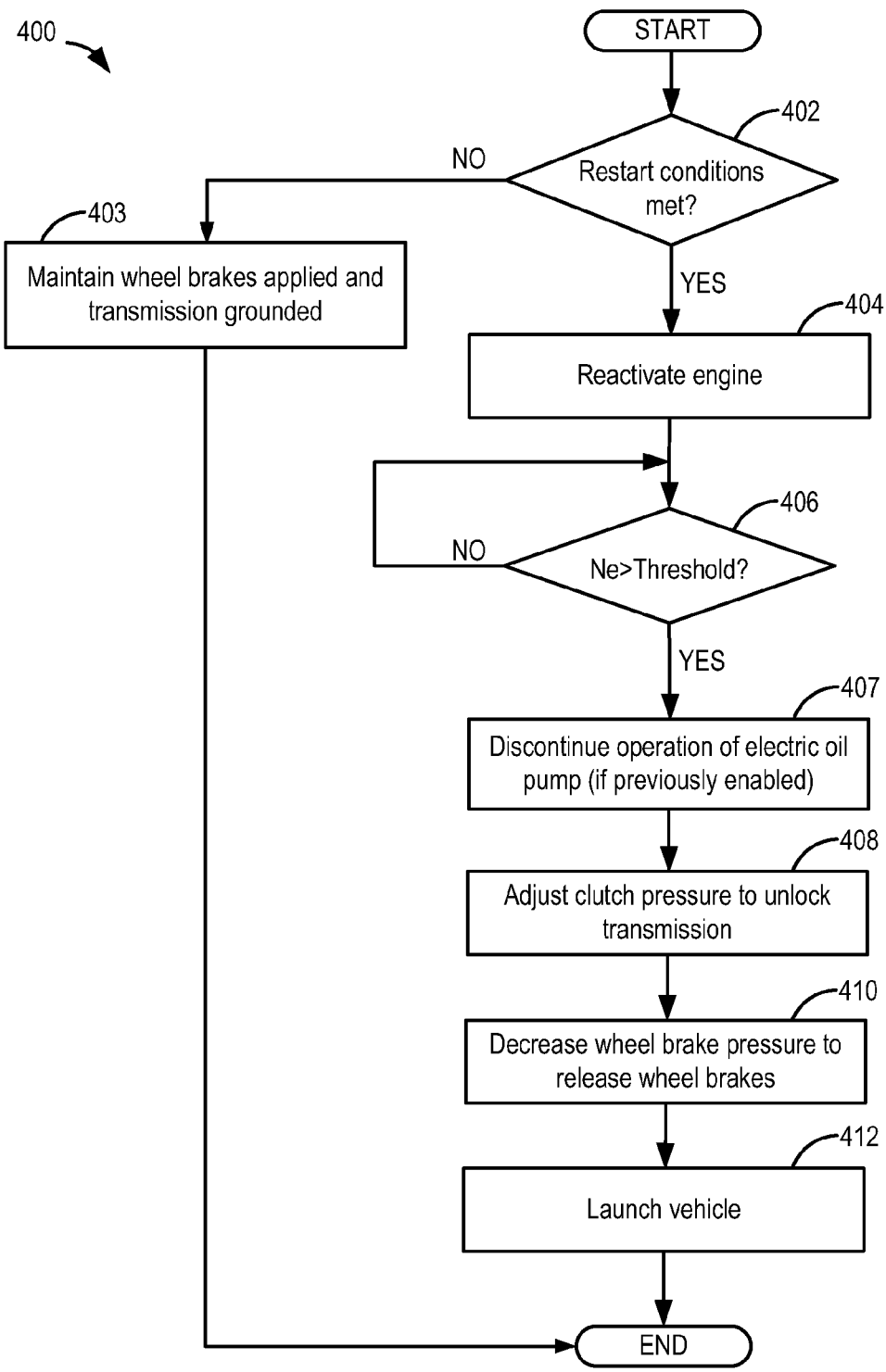
FIG. 4 shows a high level flow chart for executing an engine restart operation following the idle-stop with transmission torsion.

The following description relates generally to systems and methods for retaining at least some torsional potential energy in a transmission gear-train during an engine shutdown, responsive to idle-stop conditions, and maintaining the torsional potential energy until the engine is subsequently restarted. By maintaining transmission gear-train torsion while the engine is shutdown, driveline unwinding and transmission gear un-meshing can be reduced. As shown in FIGS. 2-3, a transmission clutch may be engaged and wheel brakes may be applied during an idle-stop engine shutdown by adjusting the clutch pressure and wheel brake pressure. Further, the engaged clutch may be locked to a frame of the vehicle thereby grounding the transmission. A timing, with respect to engine speed, of tying up the transmission and braking the wheels may be adjusted to provide the desired amount of transmission torsion. Clutch pressure and wheel brake pressure adjustments may further enable the co-ordination of the transmission grounding with the application of the wheel brakes. During a subsequent engine restart operation, as shown in FIG. 4, the engaged transmission clutch may be gradually unlocked, and the wheel brakes may be gradually released. Example shutdown and restart operations are illustrated graphically in FIG. 5. In this way, by tying up and effectively immobilizing the transmission during an engine shutdown, NVH, such as audible clunks, during a subsequent restart may be reduced. The reduction in NVH may positively impact the driver's perception of the vehicle's reliability and value while also reducing component wear.

Figure 1:
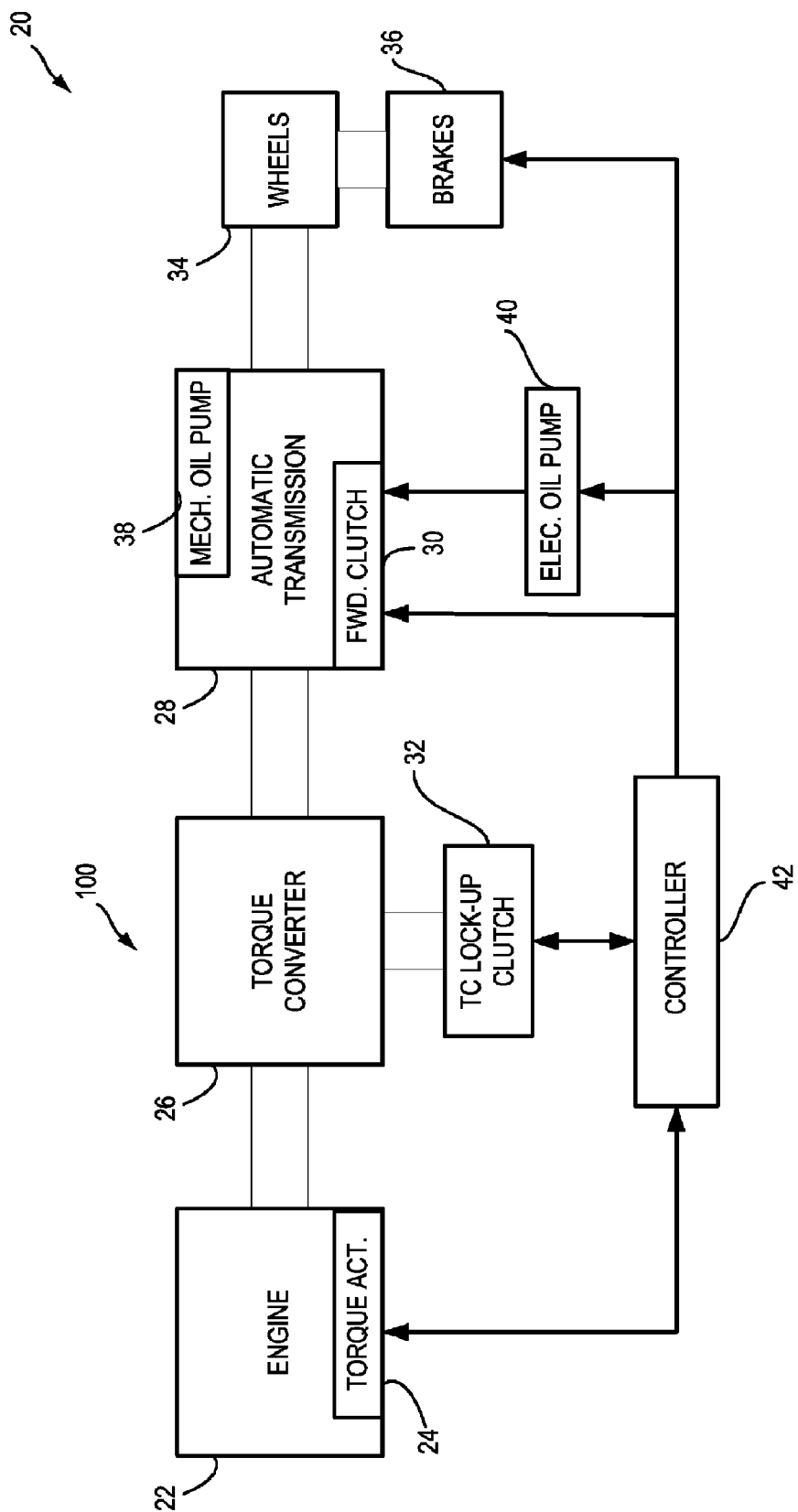
FIG. 1 shows an example vehicle system layout, including details of a vehicle drive-train.

FIG. 1 is a block diagram of a vehicle drive-train 20. Drive-train 20 may be powered by engine 22. In one example, engine 22 may be a gasoline engine. In alternate embodiments, other engine configurations may be employed, for example a diesel engine. Engine 22 may be started with an engine starting system (not shown). Further, engine 22 may generate or adjust torque via torque actuator 24, such as a fuel injector, throttle, etc.

An engine output torque may be transmitted to torque converter 26 to drive an automatic transmission 28 by engaging one or more clutches, including forward clutch 30, where the torque converter may be referred to as a component of the transmission. As such, a plurality of such clutches may be engaged, as needed. The output of the torque converter may in turn be controlled by torque converter lock-up clutch 32. As such, when torque converter lock-up clutch 32 is fully disengaged, torque converter 26 transmits torque to automatic transmission 28 via fluid transfer between the torque converter turbine and torque converter impeller, thereby enabling torque multiplication. In contrast, when torque converter lock-up clutch 32 is fully engaged, the engine output torque is directly transferred via the torque converter clutch to an input shaft (not shown) of transmission 28. Alternatively, the torque converter lock-up clutch 32 may be partially engaged, thereby enabling the amount of torque relayed to the transmission to be adjusted. A controller may be configured to adjust the amount of torque transmitted by the torque converter by adjusting the torque converter lock-up clutch in response to various engine operating conditions, or based on a driver-based engine operation request.

Torque output from the automatic transmission 28 may in turn be relayed to wheels 34 to propel the vehicle. Specifically, automatic transmission 28 may adjust an input driving torque at the input shaft (not shown) responsive to a vehicle traveling condition before transmitting an output driving torque to the wheels.

Further, wheels 34 may be locked by engaging wheel brakes 36. In one example, wheel brakes 36 may be engaged in response to the driver pressing his foot on a brake pedal (not shown). In the same way, wheels 34 may be unlocked by disengaging wheel brakes 36 in response to the driver releasing his foot from the brake pedal.

A mechanical oil pump 38 may be in fluid communication with automatic transmission 28 to provide hydraulic pressure to engage various clutches, such as forward clutch 30 and/or torque converter lock-up clutch 32. Mechanical oil pump 38 may be operated in accordance with torque converter 26, and may be driven by the rotation of the engine or transmission input shaft, for example. Thus, the hydraulic pressure generated in mechanical oil pump 38 may increase as an engine speed increases, and may decrease as an engine speed decreases. An electric oil pump 40, also in fluid communication with the automatic transmission but operating independent from the driving force of engine 22 or transmission 28, may be provided to supplement the hydraulic pressure of the mechanical oil pump 38. Electric oil pump 40 may be driven by a motor (not shown) to which an electric power may be supplied, for example by a battery (not shown).

A controller 42 may be configured to receive inputs from engine 22 and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 42 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 42 may initiate engine shutdown by shutting off fuel and spark to the engine. Further, to maintain an amount of torsion in the transmission, the controller may ground transmission 28 to a frame of the vehicle while activating wheel brakes 36. As further elaborated with reference to FIGS. 2-3, the controller may engage one or more transmission clutches, such as forward clutch 30, and lock the engaged transmission clutch(es) to a frame of the vehicle. A clutch pressure may be varied (e.g., increased) to adjust the engagement state of a transmission clutch, and provide a desired amount of transmission torsion. In one example, during the engine shutdown, hydraulic pressure for clutch modulation may be provided by enabling electric oil pump 40, if sufficient hydraulic pressure cannot be provided by the mechanical oil pump 38.

A wheel brake pressure may also be adjusted during the engine shutdown, based on the clutch pressure, to assist in tying up the transmission while reducing a torque relayed through the wheels. Specifically, by applying the wheel brakes while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

When restart conditions are satisfied, and/or a vehicle operator wants to launch the vehicle, controller 42 may reactivate the engine by resuming cylinder combustion. As further elaborated with reference to FIG. 4, to launch the vehicle, transmission 28 may be unlocked and the wheel brakes 36 may be released, to return torque to the driving wheels 34. A timing, with respect to engine speed, of transmission un-tying and wheel brake release may be adjusted based on the amount of torsional potential energy that was maintained in the transmission before the engine restart was initiated. A clutch pressure may be adjusted to unlock the transmission, while a wheel brake pressure may be adjusted to coordinate the release of the brakes with the unlocking of the transmission, and a launch of the vehicle.

Now turning to FIG. 2, an example routine 200 is described for performing an idle-stop operation in the vehicle system of FIG. 1. At 202, idle-stop conditions may be confirmed. These may include, for example, confirming the engine is operating (e.g., carrying out combustion), a battery state of charge is above a threshold (e.g., more than 30%) and battery recharging is not required, vehicle running speed is within a desired range (e.g., less than 30 mph), no request for air conditioning has been received, engine temperature (e.g., as inferred from an engine coolant temperature) is above a threshold, a throttle opening degree is less than a threshold, driver requested torque is less than a threshold, a brake pedal has been pressed, etc. As such, any or all of the idle-stop conditions may be met for an idle-stop condition to be confirmed.

If idle-stop conditions are not met, the routine may end. However, if any or all of the idle-stop conditions are met, then at 204, an idle-stop operation may be initiated. That is, an engine controller may selectively shutdown engine operation responsive to the idle-stop operating conditions without receiving an engine shutdown request from the operator. Shutting down engine operation may include selectively deactivating the engine by shutting off fuel and spark to engine cylinders. That is, cylinder combustion may be stopped, allowing the engine to start spinning down towards rest (zero speed). As such, at rest, no input torque may be provided from the engine into the transmission, causing the driveline to unwind and the transmission gears to un-mesh. Herein, to prevent the gears from un-meshing, before the engine is stopped and while positive drive torque is being transmitted through the transmission, the engine controller may adjust a transmission output so as to retain some torsional potential energy in the driveline and transmission gear-train, to thereby keep the transmission gears meshed. The torsional potential energy may then be maintained into the driveline during the shutdown.

Specifically, at 206, it may be confirmed that the engine speed has dropped below a threshold speed, but has not reached zero speed yet. Thus, as the engine speed reduces, but before the engine speed reaches zero, at 208, an engine controller may tie-up the transmission in a wound-up state with the wheel brakes applied. As further elaborated in FIG. 3, this may include adjusting a transmission clutch pressure and a wheel brake pressure to thereby ground the transmission to a frame of the vehicle with the wheel brakes activated. At 210, after tying up the transmission, the engine idle-stop operation may be completed and the engine may be brought to rest. At 212, restart conditions may be confirmed. If restart conditions are not confirmed, at 214, the transmission may be maintained in the wound-up state with the wheel brakes activated so as to maintain an amount of transmission torsion until a subsequent engine restart is requested. This may include, maintaining the clutch pressure and wheel brake pressure until an engine restart is confirmed. By maintaining the transmission grounded until restarting the engine, gear un-meshing at engine shutdown and re-meshing at engine restart may be reduced, thereby reducing system NVH, such as audible clunks.

In comparison, if restart conditions are confirmed, then at 216, a restart operation may be initiated. Further, as elaborated in FIG. 4, the grounded transmission may be unlocked and the wheel brakes may be released in coordination with the engine spin-up.

Now turning to FIG. 3, an example routine 300 is described for tying up a transmission in a wound-up state during an engine idle-stop shutdown to thereby retain an amount of torsional potential energy in the transmission gear-train and reduce gear un-meshing. The transmission gear-train torsion may then be maintained until a subsequent engine restart is commanded.

At 302, the routine may include determining engine and vehicle operating conditions. At 304, an amount of transmission torsion (herein also referred to as torsional potential energy) may be determined based on the operating conditions. In one example, the amount of torsional potential energy may be adjusted based on ambient temperature, the adjustment including increasing an amount of torsional potential energy within the gear-train as the ambient temperature falls below a threshold. As such, at cooler ambient temperatures, the engine system may be more sensitive to audible clunks than at warmer temperatures. Thus, by increasing the amount of transmission torsion maintained during engine shutdown in response to cooler temperatures, audible clunks may be anticipated and their occurrence may be reduced.

At 306, it may be determined if the hydraulic pressure of the transmission mechanical oil pump (Pmop) is greater than a predetermined threshold value. As such, since the mechanical oil pump is driven by the engine, during an engine shutdown, the hydraulic pressure output of the mechanical oil pump may correspondingly decrease. Thus, if the pressure output of the mechanical pump is not above the threshold value, then at 308, the transmission electric oil pump may be enabled. By operating an electric transmission fluid pump during the engine shutdown, in response to a drop in mechanical oil pump output, sufficient hydraulic pressure may be provided for adjusting an engagement of the transmission clutches and for tying up the transmission.

Once sufficient hydraulic pressure is available (such as, from mechanical oil pump operation at 306, or electric oil pump operation at 308), the engine controller may then proceed to ground the transmission. This may include, at 310, adjusting a clutch pressure to engage one or more transmission clutches. A timing, with respect to engine speed, of clutch engagement and transmission grounding, may be adjusted to maintain the determined amount of torsional potential energy within the gear-train of the transmission during the engine shutdown. For example, the transmission may be grounded at a higher engine speed to maintain a higher amount of torsion potential energy within the transmission gear-train. At 312, to coordinate clutch engagement and transmission grounding with a wheel brake operation, it may be confirmed that the clutch pressure (Pclutch) is above a threshold. In an alternate embodiment, an engagement state of the clutch may be confirmed. Once the clutch pressure has increased above the threshold, at 314, wheel brake pressure may be increased to apply the wheel brakes. At 316, the engaged transmission clutch(es) may be locked to a frame of the vehicle, such as to a vehicle chassis or a transmission case. In this way, by engaging the transmission clutch while applying the brakes, a drive torque may be transmitted through the transmission which may be counteracted by the wheel brakes to keep the wheels and the vehicle immobile. As such, these counteracting forces may be responsible for maintaining a torsional potential energy in the transmission gear-train to keep the gears meshed. That is, a clutch pressure and a wheel brake pressure may be adjusted such that substantially no net driving torque is relayed through the wheels, and a desired amount of torsion is retained in the transmission gear-train.

Now turning to FIG. 4, an example routine 400 is described for restarting an engine from idle-stop while reducing audible clunks during the transition. At 402, restart conditions may be confirmed. This may include, for example, confirming that the engine is in an idle-stop, a driver requested torque is greater than a threshold, a restart is requested by the air-conditioner due to a desire for air-conditioning, a battery state of charge is below a threshold, an emission control device temperature is below a threshold, a vehicle launch is requested (e.g., upon the release of a brake pedal), an electrical load is greater than threshold, etc. If restart conditions are not confirmed, then at 403, the transmission may be maintained grounded and wheel brakes may be kept applied.

If any of the restart conditions are met, then at 404, the engine may be selectively reactivated. This may include returning cylinder fuel injection and spark. As cylinder combustion is resumed, the engine may start to spin-up. At 406, it may be confirmed whether the engine speed ($N_e$) is above a predetermined threshold. When the engine speed is above the predetermined threshold, then at 407, operation of an electric oil pump may be discontinued (if previously enabled) following the engine restart. As elaborated with reference to FIG. 3, the electric oil pump may have been previously enabled in response to a drop in the pressure output of a mechanical oil pump, to thereby provide sufficient hydraulic pressure for clutch engagement during the transmission grounding operation. At 408, when the engine speed has risen above the threshold, the engaged transmission clutch(es) may be unlocked from the frame of the vehicle. This may include, adjusting (for example, decreasing) a clutch pressure to unlock the engaged clutches. A timing, with respect to engine speed, of the transmission clutch unlocking and clutch pressure decrease may be adjusted based on the amount of torsional potential energy that was retained and maintained in the transmission gear-train during the preceding engine shutdown. In one example, the adjustment may include, decreasing the clutch pressure and unlocking the engaged transmission clutch at a higher engine speed as the amount of torsional potential energy maintained in the transmission gear-train before the engine was restarted increases. Additionally, or optionally, a timing and/or rate of clutch pressure decrease and engaged transmission clutch unlocking may be adjusted based on other engine operating conditions, such as a transmission temperature (e.g., as inferred from a transmission oil temperature), or an amount of time elapsed since engine restart was initiated, for example.

At 410, the wheel brakes may be released. This may include, decreasing a wheel brake pressure to release the wheel brakes. A timing of wheel brake release may be adjusted in coordination with the unlocking of the transmission clutch such that a driving torque may be gradually relayed through the wheels without causing a sudden and large torque or torsion disturbance in the transmission gear-train. In one example, releasing the wheel brakes may include decreasing a wheel brake pressure as the engine speed rises above a threshold value and/or a clutch pressure falls below a threshold. At 412, the vehicle may be launched responsive to a driver request, for example upon release of a brake pedal by the driver.

Figure 5:
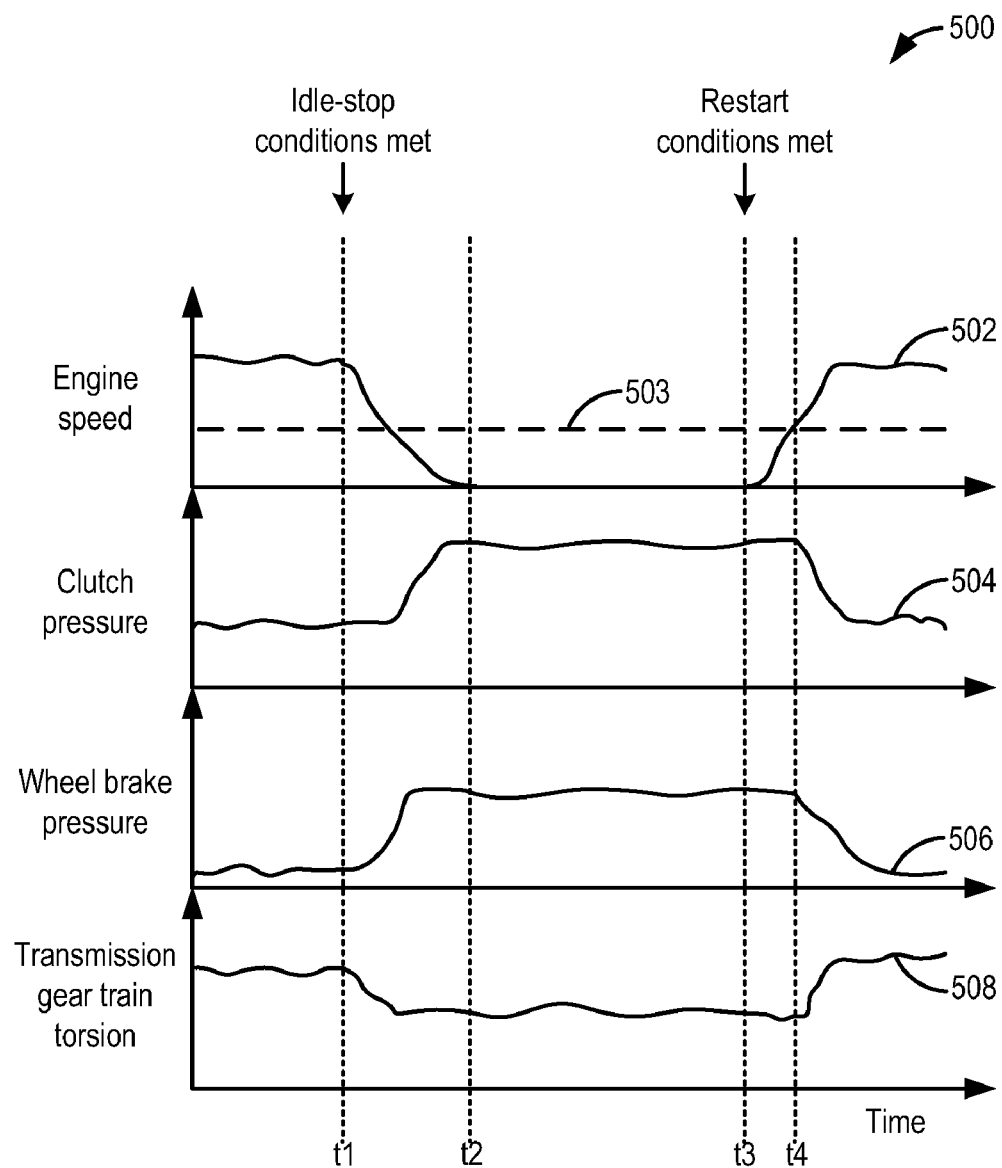
FIG. 5 shows a map with a plurality of graphs explaining example engine shutdown and restart procedures, according to the present disclosure.

To further clarify the concepts introduced herein, example engine shutdown and restart operations are described, with reference to FIG. 5, for a vehicle with a power train including an engine and an automatic transmission, the power train coupled to driving wheels of the vehicle. FIG. 5 includes map 500 with a plurality of graphs 502-508 depicting changes in clutch pressure (graph 504), wheel brake pressure (graph 564), and transmission gear-train torsion (graph 508) during an engine shutdown and a subsequent engine restart (as represented by changes in engine speed, at graph 502). It will be appreciated that while vehicle speed is not indicated, it may remain at zero during the entire duration illustrated in FIG. 5.

At t1, idle-stop conditions may be met. In response to the idle-stop operating conditions, and without receiving an engine shutdown request from the vehicle operator, the engine may be selectively deactivated by turning off fuel and spark to engine cylinders. In response to the stopping of cylinder combustion, engine speed (graph 502) may start to fall as the engine spins towards rest. While the engine is spinning down and positive torque is still being transmitted through the transmission, but before the engine is stopped (that is, between t1 and t2), an engine controller may ground the transmission to the vehicle, while activating the wheel brakes, to maintain an amount of torsion in the transmission gear-train. The transmission may then be maintained grounded with the amount of transmission gear-train torsion until a subsequent engine restart is commanded. A timing, with respect to engine speed, of the transmission grounding may be adjusted based on a desired amount of transmission gear-train torsion. This amount may, in turn, be determined based on vehicle operating conditions, such as ambient temperature. For example, during colder conditions, in anticipation of louder audible clunks, an engine controller may maintain a larger amount of transmission torsion during an engine shutdown, while during warmer conditions, a smaller amount of transmission torsion may be maintained during the engine shutdown. In one example, the transmission may be grounded at a higher engine speed to provide a higher amount of transmission gear-train torsion.

As shown in graph 504, following t1, but before engine rest at t2, a transmission clutch pressure may be adjusted (for example, increased) to engage a transmission clutch, and further to lock the engaged transmission clutch to a frame of the vehicle. At the same time, wheel brakes may be applied. As shown in graph 506, a wheel brake pressure may be adjusted (for example, increased) between t1 and t2, to activate the wheel brakes in coordination with the transmission grounding. In one example, the transmission may be grounded (that is, clutch may be engaged and the engaged clutch may be locked) and wheel brakes may be applied when the engine speed has dropped below a threshold engine speed 503. By grounding the transmission with the wheel brakes activated, a driving torque relayed through the transmission may be counteracted by the wheel brakes so that substantially no driving torque is relayed through the driving wheels, while the torque is advantageously used to maintain transmission gear-train torsion (graph 508) and reduce gear un-meshing. Further, by adjusting a timing, with respect to engine speed, of the transmission grounding and the wheel brake application, the amount of transmission gear torsion retained may be adjusted. However, it will be appreciated that the transmission gear-train torsion maintained during the engine shutdown (that is, between t1 and t3), may be lower than a transmission torsion experienced by the gear-train during engine operation following a restart (that is, after t3).

The clutch pressure (graph 504) and wheel brake pressure (graph 506) may be maintained during the engine shutdown so as to maintain the transmission grounded with the wheel brakes applied until a subsequent engine restart is requested. At t3, in response to engine restart conditions being met and/or upon receiving an engine restart and relaunch request from the operator, the engine may be selectively reactivated by returning fuel and spark to the engine cylinders. Accordingly, engine speed (graph 502) may start to increase. In response to the engine restart request, the engaged transmission clutch may be unlocked while releasing the wheel brakes to relaunch the vehicle. A timing, with respect to engine speed, of transmission unlocking and wheel brake release may be adjusted based on the amount of torsion that was maintained in the transmission gear-train before the engine restart. In one example, the engaged transmission clutch may be unlocked, by reducing clutch pressure, at a higher engine speed as the amount of torsion that was maintained in the driveline at the time of the engine restart increases. Similarly, a timing of wheel brake release may be adjusted based on the engine speed and/or the clutch pressure so as to coordinate the transmission unlocking operation with the wheel brake release, thereby enabling a smooth engine restart and relaunch with reduced NVH. In the depicted example, the grounded transmission may be unlocked at t4 when the engine speed is at a threshold 503. Additionally, the wheel brake pressure may be decreased at t4 as the engine speed rises above threshold 503. It will be appreciated that while the depicted example illustrates using a similar engine speed threshold and timing for clutch pressure application and release, and wheel brake pressure application and release, in alternate embodiments, each operation may be have distinct engine speed thresholds and timings.

In this way, torque may be retained during an engine shutdown and applied to the transmission gear-train while wheel brakes are activated to reduce driveline and transmission gear unwinding. By maintaining transmission torsion during an engine shutdown, driveline unwinding and gear un-meshing may be reduced, thereby reducing audible clunks and NVH due to gear re-meshing during a subsequent engine restart. By reducing NVH, driver feel and component life may be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a vehicle power-train including wheels, an engine and a transmission, comprising:
    selectively shutting down engine operation responsive to operating conditions and without receiving an engine shutdown request from an operator;
    before the engine is stopped and while positive drive torque is still transmitted through the transmission, grounding the transmission to the vehicle;
    maintaining the transmission grounded until restarting the engine;
    wherein grounding the transmission includes adjusting a clutch pressure to engage a transmission clutch, and locking the engaged transmission clutch to a frame of the vehicle;
    wherein a timing, with respect to engine speed, of the transmission grounding is adjusted to maintain an amount of torsional potential energy within a gear-train of the transmission; and
    wherein the amount of torsional potential energy is adjusted based on ambient temperature, the adjustment including increasing the amount of torsional potential energy within the gear-train as ambient temperature falls below a threshold.

2. The method of claim 1, wherein shutting down engine operation includes shutting off fuel and spark.

3. The method of claim 1, wherein the clutch pressure is maintained until engine restart.

4. The method of claim 3, wherein maintaining clutch pressure includes operating an electric transmission fluid pump during the engine shutdown, and discontinuing operation of the electric transmission fluid pump following engine restart.

5. The method of claim 1, wherein the adjustment of the timing of the transmission grounding includes grounding the transmission at a higher engine speed during colder conditions to maintain a higher amount of torsional potential energy within the gear-train of the transmission during colder conditions, as compared to an engine speed at which the transmission is grounded during warmer conditions and a torsional potential energy within the gear-train of the transmission during warmer conditions.

6. The method of claim 1 further comprising, during a subsequent engine restart from the engine shutdown, unlocking the engaged transmission clutch from the frame of the vehicle, a timing of the unlocking of the transmission clutch, with respect to engine speed, being adjusted based on the amount of torsional potential energy.

7. The method of claim 6, wherein the adjustment of the timing of the unlocking of the transmission clutch includes unlocking the engaged transmission clutch at an engine speed based on an amount of torsional potential energy maintained within the gear-train of the transmission before engine restart.

8. The method of claim 6, further comprising, applying wheel brakes during the engine shutdown and releasing the wheel brakes during the subsequent engine restart.

9. The method of claim 8, wherein applying wheel brakes includes increasing a brake pressure as the amount of torsional potential energy and/or clutch pressure increases above a threshold value, and wherein releasing wheel brakes includes decreasing brake pressure as engine speed rises above a threshold value.

10. A method of controlling a power-train of a vehicle, the power-train including an engine and an automatic transmission, the power-train coupled to driving wheels of the vehicle, the vehicle operated by an operator, the method comprising:
    selectively deactivating the engine responsive to operating conditions and without receiving an engine shutdown request from the operator;
    before the engine is stopped and while positive drive torque is still transmitted through the transmission: grounding the transmission to the vehicle, and activating wheel brakes, to maintain an amount of torsion in a transmission gear-train; and
    maintaining the transmission grounded with the amount of transmission gear-train torsion until an engine restart.

11. The method of claim 10, wherein grounding the transmission includes adjusting a transmission clutch pressure to lock an engaged transmission clutch to a frame of the vehicle.

12. The method of claim 11, wherein the transmission is grounded at a higher engine speed during colder conditions to provide a higher amount of transmission gear-train torsion during colder conditions, as compared to an engine speed at which the transmission is grounded during warmer conditions and a torsional potential energy within the gear-train of the transmission during warmer conditions.

13. The method of claim 12, further comprising,
    selectively reactivating the engine responsive to operating conditions and/or upon receiving an engine restart request from the operator; and
    unlocking the engaged transmission clutch while releasing the wheel brakes to launch the vehicle.

14. The method of claim 13, wherein the engaged transmission clutch is unlocked at an engine speed based on the amount of transmission gear-train torsion maintained in the transmission gear-train before engine restart.

15. A vehicle system, comprising:
    a power-train including wheels, an engine, and an automatic transmission including one or more transmission clutches;
    wheel brakes; and
    a control system including non-transitory computer readable instructions to:
        selectively shut down engine operation responsive to operating conditions and without receiving an engine shutdown request from an operator;
        before the engine is stopped and while positive drive torque is still transmitted through the transmission, ground the transmission with wheel brakes activated to maintain an amount of torsion in the transmission; and
        maintain the transmission grounded with the amount of transmission torsion until an engine restart.

16. The system of claim 15, wherein the control system further includes instructions to,
    during a subsequent engine restart from the engine shutdown,
    restart the engine; and
    unlock the grounded transmission while releasing the wheel brakes to launch the vehicle.

17. The system of claim 16, wherein the control system further includes instructions to ground the transmission at a higher engine speed during colder conditions during engine shutdown to maintain a larger amount of torsion in the transmission during colder conditions, as compared to an engine speed at which the transmission is grounded during warmer conditions and a torsional potential energy within the gear-train of the transmission during warmer conditions; and to unlock the grounded transmission at an engine speed during engine restart based on an amount of torsion maintained in the transmission at engine restart.

* * * * *